United States Patent [19]

Hall

[11] 3,748,525

[45] July 24, 1973

[54] VERTICAL CONVERGENCE CIRCUITS UTILIZING POSITIVE FEEDBACK FOR STABILIZATION

[75] Inventor: Cyril John Hall, Zurich, Switzerland

[73] Assignee: RCA Corporation, New York, N.Y.

[22] Filed: Jan. 21, 1972

[21] Appl. No.: 219,715

[30] Foreign Application Priority Data

July 5, 1971 Great Britain .................. 31,463/71

[52] U.S. Cl. ...... 315/13 C, 315/27 TD, 315/27 GD, 315/29

[51] Int. Cl. ........................................ H01j 29/50

[58] Field of Search ..................... 315/13 C, 27 TD, 315/29, 27 GD

[56] References Cited

UNITED STATES PATENTS

| | | | |
|---|---|---|---|
| 2,997,622 | 8/1961 | Claypool | 315/29 |
| 3,434,004 | 3/1969 | Smeulers et al. | 315/27 TD |
| 3,544,810 | 12/1970 | McDonald et al. | 315/27 TD |

*Primary Examiner*—Carl D. Quarforth
*Assistant Examiner*—P. A. Nelson
*Attorney*—Eugene M. Whitacre

[57] ABSTRACT

Transformerless vertical deflection circuits often employ negative feedback to linearize its amplifier operation. Where a vertical convergence circuit is coupled in parallel with the vertical deflection yoke, such negative feedback stabilizes the sum of the currents flowing in the deflection yoke and convergence circuit, but undesirably permits adjustments in the convergence current to adversely affect picture height and/or linearity by causing the deflection current to vary in an oppoosite manner. Arrangements are herein described for maintaining the parallel coupling of the vertical convergence circuit with its deflection yoke, but in a manner to eliminate the convergence current from the feeback-loop which then stabilizes the deflection current only.

5 Claims, 3 Drawing Figures

VERTICAL CONVERGENCE CIRCUITS UTILIZING POSITIVE FEEDBACK FOR STABILIZATION

BACKGROUND OF THE INVENTION

1. Field of the Invention

This invention relates to vertical convergence circuits for a multibeam color kinescope and, more particularly, to such circuits as are coupled in parallel with a vertical deflection yoke.

2. Description of the Prior Art

Such arrangements have been described in the prior art, and oftentimes include an S-correction capacitor and a current sampling resistor serially coupling the deflection yoke between a transformerless vertical deflection output stage and a point of reference potential. Appropriate feedback from the resistor to the input of the vertical deflection amplifiers stabilizes the sum of the deflection and convergence currents flowing through the resistor, but in a manner such that service adjustments which are made to vary the convergence current undesirably vary the deflection current as well. Such variation in deflection current adversely affects the reproduced picture height and/or linearity, because of this interdependency of currents, and complicates the set-up procedure for the color television receiver.

SUMMARY OF THE INVENTION

As will become clear hereinafter, each of the embodiments of the present invention develops a control voltage from the convergence current which is substantially equal in magnitude, but opposite in polarity, to that which the convergence current develops when flowing through the sampling resistor of the circuit. These two voltages are then combined to cancel one another, and thereby provide a feedback indication which is substantially representative of changes in the vertical deflection current only. In one embodiment of the invention, an isolating transformer of unity ratio is employed to inject the compensating voltage into the feedback circuit. A second embodiment utilizes a transistor stage as the isolating amplifier.

BRIEF DESCRIPTION OF THE DRAWINGS

These and other advantages of the present invention will be more clearly understood from a consideration of the following description taken in connection with the accompanying drawings in which.

DETAILED DESCRIPTION OF THE DRAWINGS

Figure 1:
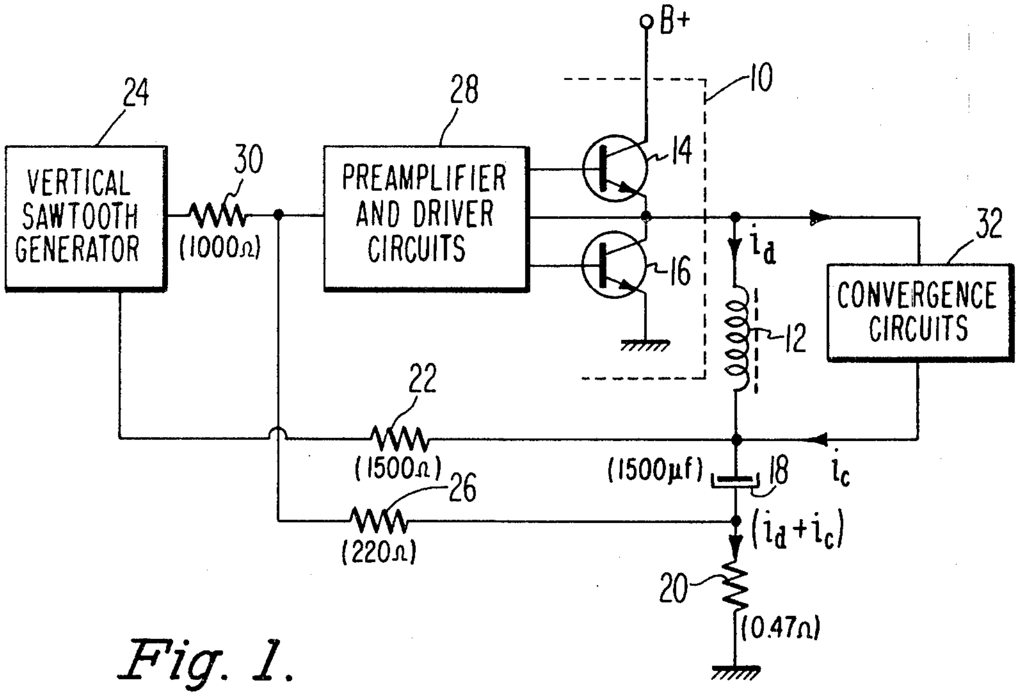
FIG. 1 schematically illustrates a portion of a color television receiver including vertical convergence circuitry constructed in accordance with a prior art teaching.

In FIG. 1, a transformerless vertical deflection output amplifier 10 is coupled to a relatively low impedance vertical deflection yoke 12. The output amplifier 10 is shown as including two like conductivity transistors 14, 16 in push-pull arrangement, with the yoke 12 being coupled to the joined emitter electrode of transistor 14 with the collector electrode of transistor 16. As is well known, several different versions of transformerless output amplifiers may be employed for vertical deflection—for example, complimentary symmetry amplifiers having emitter electrode outputs and opposite conductivity amplifiers having collector electrode outputs. is The windings of yoke 12 may be separated into two equal portions with a pincushion correction transformer coupled between the halves of the yoke—but for purposes of simplicity, only a single winding is shown in FIG. 1. A temperature compensating thermistor, having a negative temperature coefficient, may also be preferably coupled in series with the yoke 12, but is omitted from the drawing for the same reason. Where the yoke 12 is toroidally wound, it may have an impedance in the range of one to five ohms, with a representative value for presently available toroidal yokes being approximately 2 ohms. A relatively large S-correction capacitor 18 and a current sampling resistor 20 complete the return path for the current in yoke 12 to a point of reference potential, such as ground. As is customary in transformerless vertical deflection circuits, appropriate feedback from the S-correction capacitor 18 is provided by a resistor 22 to the vertical sawtooth generator 24 of the receiver, while an appropriate negative feedback from the current sampling resistor 20 i provided by a resistor 26 to the input of the preamplifier and driver circuit stage 28 for the output amplifier 10. As illustrated, a further resistor 30 serves to couple the output of the sawtooth generator 24 to the input of the preamplifier stage 28.

A vertical convergence circuit 32 is also included, being coupled in parallel with the deflection yoke 12. The circuit 32 may be of any suitable design, and can be either of passive or dynamic configuration. One particularly attractive dynamic convergence circuit in accordance with which the present invention is operative is disclosed in pending U.S. Patent application Ser. No. 215,864, Filed Jan. 6, 1972 and entitled "VERTICAL CONVERGENCE CIRCUITS". The circuit therein described recognizes that many misconvergence patterns require correction at the top of the reproduced picture which may not match the correction required at the bottom of the picture. The invention of that application therefore provided a first control for altering the magnitude of the end (bottom) of scan energizing waveform and a second control for altering the magnitude of the beginning (top) of scan energizing waveform, but particularly in a manner wherein interaction between the various controls were avoided. Such arrangement substantially eliminated the need to readjust one control after the other control was varied, and greatly simplified the set-up adjustments of the receiver.

The apparatus of the present invention is also concerned with the need for requiring control readjustment after a vertical convergence variation is effected. The reason for this follows from the construction of FIG. 1, where it will be noted that the negative feedback provided by resistor 26 serves to stabilize the sum of the vertical deflection and convergence currents through resistor 20—adjustments made to vary the convergence current so as to shift beam landings on the kinescope will then also vary the deflection current which flows, in an opposite direction. This interrelationship between the deflection current and convergence current thus undesirably leads to change in the reproduced picture height or in its linearity whenever convergence adjustments are made. This interaction complicates the adjustment procedure and increases the time required to perform set-up operations.

Figure 2:
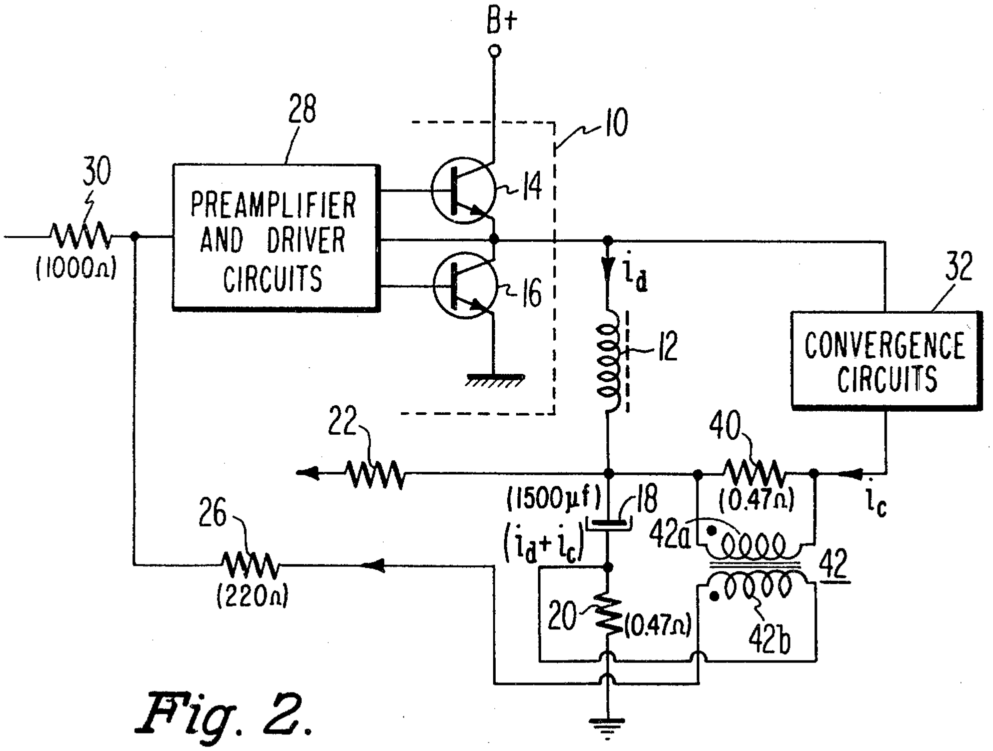
FIG. 2 illustrates a portion of the arrangement of FIG. 1 including the isolating transformer construction of the invention.

One solution to this problem is illustrated by the FIG. 2 construction which, in accordance with the present invention, adds, at an appropriate point in the overall feedback loop, a current to cancel the effect of the convergence current flowing through resistor 20. Thus, a further resistor 40, equal in resistance value to that resistor 20, is coupled in series between the low potential end of the yoke 12 and the convergence circuit 32 to develop a voltage which is directly proportional to the convergence current ($i_c$) flowing in the circuit 32. The primary winding 42*a* of a unity ratio isolating transformer 42 is coupled across the resistor 40, while the secondary winding 42*b* of transformer 42 is coupled to inject a voltage equal to that developed across resistor 40 into the feedback path in a way to cancel the voltage produced by the convergence current in resistor 20. To accomplish this, feedback resistor 26 is coupled to the high potential terminal of winding 42*b*, the low potential terminal of which is coupled to the junction between capacitor 18 and resistor 20. The substantial cancellation of the equal voltages produced by the convergence current across resistors 20 and 40 by virtue of the polarity reversal provided by the coupling of transformer 42 thus compels the feedback resistor 26 to stabilize only the vertical deflection yoke current $i_d$ rather than the sum total of the convergence and deflection currents. The "bucking" afforded by the resistor 40-transformer 42 combination cancels the effect of the convergence current in resistor 20 and thereby eliminates the interaction between the convergence and vertical deflection currents which—in the construction of FIG. 1—existed to undesirably vary picture height or linearity with convergence current adjustment.

Figure 3:
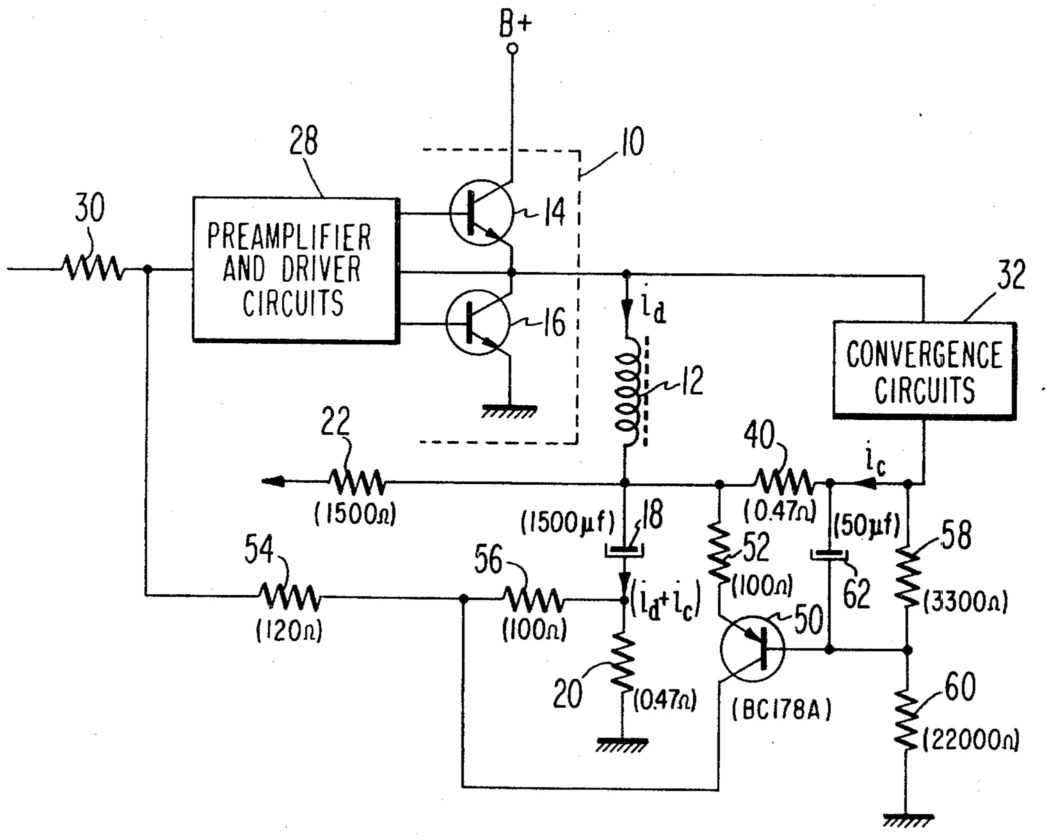
FIG. 3 illustrates a portion of the FIG. 1 arrangement utilizing the isolating transistor amplifier construction according to the invention.

The construction of FIG. 3 is similar to that of FIG. 2 in that the effect of the convergence current through resistor 20 is eliminated, but differs therefrom in its use of a transistor as an isolating amplifier, instead of the more costly transformer 42. In FIG. 3, the transformer 42 is removed, and in its place a transistor, three resistors and a capacitor are added. In addition, the feedback resistor 26 is replaced by a pair of serially coupled resistors whose resistance value together preferably equals that of the resistor 26 previously used.

As shown, the emitter electrode of the added transistor 50 is coupled by a first resistor 52 to the junction of resistor 40 and the low potential end of the yoke 12 while the collector electrode of transistor 50 is coupled to the junction of the series connected resistors 54, 56 which serve as the replacement for the feedback resistor 26. The base electrode of transistor 50 is coupled, on the one hand, via the second added resistor 58 to the junction of resistor 40 and the convergence circuit 32 and, on the other hand, by the third resistor 60 to the reference potential point. Lastly, a capacitor 62 is coupled in parallel with resistor 58.

Here, the collector electrode current of transistor 50 will be seen to be controllable by the voltage developed across resistor 40 and by the selection of component values for the resistors 52, 58 and 60. With the PNP transistor polarity indicated, appropriate selection of these component values can cause the voltage injected into the feedback loop at the junction of resistors 54, 56 to be equal in magnitude but opposite in polarity to the voltage produced across resistor 20 by the convergence current $i_c$. The effect of the convergence current will thus be cancelled in the feedback loop which, as with the construction of FIG. 2, then serves to maintain the deflection current $i_d$ constant and independent of variations in convergence current $i_c$ as beam landing adjustments are made. It will be noted that the relatively large alternating voltage developed at the junction of capacitor 18 and the yoke 12 is applied both to the emitter and base electrodes of transistor 50 and, therefore, does not modulate the collector electrode current.

Although elimination of the convergence current flow through the current sampling resistor 20 can also be effected by employing a convergence circuit connected in series with the deflection yoke, it will be appreciated that such arrangement is not as attractive as the parallel configuration illustrated in the drawings because the power which would be absorbed from the deflection system is that much greater. With the arrangements illustrated, a transformerless push-pull output stage may be utilized in the vertical deflection amplifier, and is linearized and stabilized by the feedback proportional to the output current that flows through the current sampling resistor. The amplifier is driven by a sawtooth voltage that has the shape of the required deflection current, and a blocking capacitor is used in series with the yoke at its low potential end so that the parabolic voltage developed across the capacitor is available for use in other circuits—such as for the S-correction of the sawtooth waveform that drives the amplifier. Independent adjustment of the convergence currents can be made with a circuit of the type disclosed in pending application Ser. No. 215,864, and in a manner which does not affect picture height and/or linearity.

While there have been described what are considered to be preferred embodiments of the present invention, it will be readily apparent that other modifications may be made by those skilled in the art without departing from the teachings herein.

What is claimed is:

1. In a color television receiver having a vertical deflection circuit for providing vertical rate drive signals to an associated vertical deflection yoke, a convergence circuit coupled in parallel connection with said deflection yoke, and circuit means including a first resistor for serially coupling each of said convergence circuit and said yoke to a point of reference potential, the combination therewith of:

control means coupled to said first resistor for sensing the sum total of vertical deflection yoke current and convergence current flows therein and for providing a feedback control signal to said deflection circuit to stabilize the magnitude of deflection yoke current independent of variations in the magnitude of convergence current which cause said sum total of currents to vary, said control means comprising:

a second resistor of substantially the same resistance value as said first resistor and also coupled to said convergence circuit, for developing a voltage thereacross in response to said convergence current flow;

and means coupled to said second resistor for combinedly adding in opposite polarity the voltage developed thereacross in response to convergence current flow with the voltage developed across said first resistor in response to said sum total current flows in providing said feedback control signal in such manner as to cancel voltage components due to convergence currents;

whereby the effect of subsequent adjustment of the convergence current flow through said first resistor on the magnitude of deflection yoke current becomes invariant.

2. The combination of claim 1 wherein said voltage coupling means includes a unity-ratio transformer having a primary winding across said second resistor and a secondary winding serially coupled with said first resistor in such polarity relationship that the voltage induced in said secondary winding by said convergence current flow through said second resistor is in a direction to cancel the voltage developed across said first resistor by convergence current flow therethrough.

3. The combination of claim 2 wherein said feedback control signal is provided to said vertical deflection circuit from the high potential terminal of said transformer secondary winding, the low potential terminal of which is connected to the end of said first resistor which is remote from said point of reference potential.

4. The combination of claim 1 wherein said voltage coupling means includes an amplifier transistor coupled across said second resistor and biased by the voltage developed thereacross in response to convergence current flow therethrough to provide an output current flow through said first resistor which is substantially equal in magnitude, but opposite in polarity, to the convergence current flowing through said first resistor.

5. The combination of claim 4 wherein there is included a third resistor coupling the emitter electrode of said amplifier transistor to one terminal of said second resistor, fourth and fifth resistors serially coupling a second terminal of said second resistor to said point of reference potential, a sixth resistor coupling the collector electrode of said amplifier transistor to the end of said first resistor which is remote from said reference potential point, and a direct current connection between the base electrode of said amplifier transistor and the junction between said fourth and fifth resistors.

* * * * *